H. STRIETH.
PLANT FOR PRODUCING PAPER PULP AND FREEING IT FROM LIQUID.
APPLICATION FILED JULY 27, 1911.
1,023,445. Patented Apr. 16, 1912.
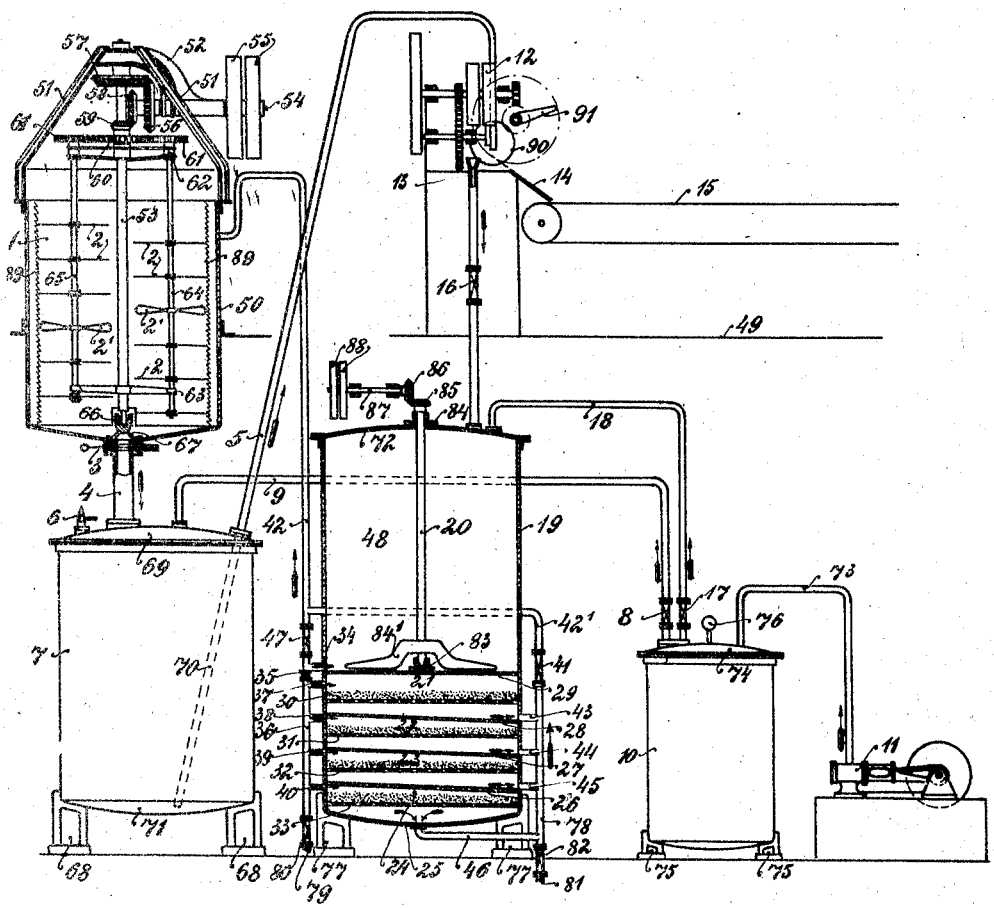

UNITED STATES PATENT OFFICE.

HEINRICH STRIETH, OF NUREMBERG, GERMANY.

PLANT FOR PRODUCING PAPER-PULP AND FREEING IT FROM LIQUID.

1,023,445.  Specification of Letters Patent.  Patented Apr. 16, 1912.

Application filed July 27, 1911. Serial No. 640,741.

*To all whom it may concern:*

Be it known that I, HEINRICH STRIETH, a citizen of the Empire of Germany, residing at Nuremberg, in the Empire of Germany, have invented a new and useful Plant for Producing Paper-Pulp and Freeing It from Liquid, of which the following is a specification.

My invention consists of a new plant capable of producing paper pulp from printed or written papers, old paste-boards and other old raw materials or from new raw materials, such as cellulose, ground wood and the like, and of freeing the paper pulp produced from liquid.

The ordinary rag-engines and other known paper pulp producing machines used in the manufacture of paper, cardboard, millboard, and the like are to be replaced by apparatus contained in the new plant.

The new plant comprises an apparatus for receiving the raw materials together with a lye and additional chemicals, further for cutting up the raw materials and subjecting them to the action of the lye by agitation, a receptacle for receiving from this apparatus the stuff and allowing the lye to further act upon the materials, a press for separating the lye, pure or impure, from the paper pulp and discharging the pulp freed from liquid for further treatment, a second apparatus for mixing the impure lye with chemicals adapted to precipitate the impurities, filters for separating the purified lye from the precipitate, and means for passing the stuff from the receptacle to the press, the liquid separated from the press to the second apparatus, the liquid mixed with chemicals from the second apparatus to the filters and the purified lye from the filters to the first apparatus. The plant is so arranged, that no lye is wasted and that nothing of the stuff gets lost.

I will now proceed to describe my invention with reference to the accompanying drawing, which diagrammatically represents a plant, the first and second apparatus and the filters being shown in a vertical section and the other apparatus in an elevation.

1 denotes the first apparatus, which is shown to consist of a vertical cylindrical vessel 50 open at the top and supported by some floor or stage 49, and of a cutting-up, mixing and agitating gear within the vessel 50. On the top of the vessel a frame is disposed, which is shown to consist of several inclined tubes 51 and a head-piece 52 connecting them. A central shaft 53 is mounted to turn in the head-piece 52 above and in a footstep-bearing 66 below and has fastened on it a bevel wheel 57 and two crossheads or stars 62 and 63. A driving shaft 54 is mounted in the head-piece 52 to turn and carries fast and loose pulleys 55, 55 for driving by means of a bevel wheel 56 the already mentioned bevel wheel 57 with the central shaft 53 and by means of a smaller bevel wheel 58 another bevel wheel 59 loose on the central shaft. The bevel wheel 59 is rigidly connected with a large gear wheel 60 supported by the upper crosshead or star 62. Several (here two) vertical shafts 64, 65 are mounted to turn in the free ends of the crossheads or stars 62 and 63 and have fastened on their upper ends gear wheels 61, 61, which mesh with the large gear wheel 60. Each shaft 64 or 65 is shown to have fast on it six stars 2, 2 each comprising several arms or knives, which may be serrated on their edges and, if so preferred, may have on their upper and lower sides pins or similar devices for cutting through the raw materials. Several vertical serrated ribs 89, 89 distributed over the periphery are fastened to the inside of the vessel 50. These ribs 89, 89 may be inclined to the periphery of the vessel so as to permit the materials during their motion to slide off the ribs, whereby their mixture with the lye is furthered. Where so preferred, some of the ribs 89, 89 may be hinged to the inside of the vessel and be pressed by means of suitable springs against stops, which hold them in their normal position. The footstep-bearings 66 for the lower end of the central shaft 53 is shown to be supported by means of arms 67 at a convenient height above the central hole j in the bottom of the vessel 50, which bottom is connected with a slide-valve 3 of any known construction. Where so preferred, some of the knives 2, 2, for example, $2^1$, $2^1$, may be inclined to the shaft 64 or 65 similar to the blades of a screw-propeller for the purpose of creating a circulation of the contents within the vessel 50.

It will be understood, that the driving gear described sets the central shaft 53 with the crossheads or stars 62, 63 to rotate in one direction and the shafts 64, 65 with the stars 2, 2 to rotate in the same direction. Where so preferred, the driving gear may be so arranged as to drive the central shaft 53 on the one hand and the shafts 64, 65 on the other hand in opposite directions. The vessel 50 can be charged with the raw materials and the additional chemicals through the spaces between the tubes 51, 51.

7 denotes a closed receptacle, which may be supported by suitable feet 68, 68. The top 69 of the receptacle 7 may be connected by means of a straight or bent tube 4 with the slide-valve 3. The top 69 is shown to be connected with an inclined tube 70, which reaches down to a point at a small height above the bottom 71 of the vessel 7. An air-valve 6 may be disposed on the top 69 and the receptacle 7 may be provided with a sampler of any known construction (not shown), also with a pressure gage, a water-glass and a device (for example a cock or a valve) for discharging any precipitate from the bottom 71. The three last named parts are not shown, as they may be of any known construction.

12 denotes a press of any known construction capable of squeezing the liquid out of the paper pulp. This press may comprise a cylinder 90, one cover of which is movable and is connected with machine parts, so that it can be periodically pressed against the cylinder and again moved away from the same. A distributing valve disposed above the cylinder 90 and operated from the driving gear is connected by means of a tube 5 with the above mentioned tube 70 and is adapted to periodically admit stuff from the receptacle 7 to the cylinder 90 and to shut off the supply. A piston reciprocating within the cylinder 90 is so operated from the driving gear as to periodically stop in either extreme position and to press the stuff admitted to the cylinder 90 against the movable cover for squeezing all liquid out of the pulp. Both the piston and the movable cover are on the inside provided with a perforated disk lined with filter-cloth or the like, a thin space being left between the sieve and the piston or cover, and also with a tube leading from this space through the piston or cover to without. When the paper pulp in the cylinder 90 between the piston and the movable cover is being pressed for squeezing out the liquid, the said distributing valve is closed by means of the said machine parts. After this pressing the cover is moved away from the cylinder and the piston is moved outward until it flushes with the edge of the cylinder, so that the pressed pulp can drop off the piston. A rocking stripper 91 is preferably provided, which is adapted to engage between the piston in its outer extreme position and the movable cover and is periodically operated from the driving gear for stripping the pressed pulp off the piston, should it not already have dropped.

13 is a tube adapted to collect the liquid squeezed out of the paper pulp and flowing off through the said two tubes.

14 denotes a chute for receiving the paper pulp freed from liquid and delivering it up to an endless belt 15, which carries the pulp to some machine for further treatment. The belt 15 may also form a part of a paper making machine or of a millboard-machine or the like. Where so preferred, the chute may be replaced by an inclined endless apron.

48 denotes the second apparatus, which is shown to be contained with the filters in a closed cylindrical vessel 19. This vessel is supported by suitable feet 77, 77 and is divided by a partition 29 into the said second apparatus 48 above and a lower portion, which latter in turn is divided by three slightly inclined partitions 28, 27, 26 into four filter chambers 21, 22, 23, 24. Where so preferred, the plane partitions 28, 27, 26 may be shallow calottes. Perforated false bottoms or sieves 30, 31, 32, 33 divide each of the four filter chambers 21, 22, 23, 24 into two spaces and are covered with any suitable filtrating material of such a thickness, that a space is still left between the upper surface of the filter and the bottom of the next higher compartment. These spaces above the filters are connected by means of branches 37, 38, 39, 40 with a vertical main tube 36, while the spaces beneath the filters are connected by means of branches 43, 44, 45, 46 with another vertical main tube 78. A tube 42 connects the vessel 50 of the first apparatus 1 with a stop valve 47 placed on a connection 34, which communicates with the second apparatus 48 at a point just above its bottom 29. A slide-valve 35 is inserted between the connection 34 and the upper end of the main tube 36. The lower end of the main tube 36 can be connected with the discharging tube 79 and disconnected therefrom by means of a stop valve 80. The upper end of the other main tube 78 can be connected with the tube 42 by means of a branch tube 42¹ and disconnected therefrom by means of a stop valve 41. The lower end of the main tube 78 can be connected with a tube 81 leading to some source of water and disconnected therefrom by means of a stop valve 82. The top 72 of the vessel 19 is connected with the already mentioned tube 13 and a stop valve 16 inserted in the tube 13 serves for shutting off the supply of squeezed-out liquid from the second apparatus 48. The second apparatus 48 may be provided with a pressure gage, water-glass and a sampler of any known construction, also a charging valve, all of which are not shown.

Within the second apparatus 48 a central shaft 20 is mounted to turn in a suitable footstep-bearing 83 below and a bearing 84 in the top 72. The central shaft 20 is shown to have fastened on it a pair of agitating arms 84¹ in close proximity of the bottom 29 and a bevel wheel 85 above. The bevel wheel 85 meshes with another bevel wheel 86 fast on a shaft 87, which can be driven from without by means of suitable fast and loose pulleys 88, 88.
11 denotes an air-compressor of any known construction, which is adapted to compress air up to any suitable pressure and to discharge it into a closed reservoir 10 through a tube 73 in the direction of the arrow. Where so preferred, filters and other air purifying devices of any known construction may be inserted in the tube 73 between the compressor 11 and the reservoir 10 for the purpose of obtaining pure compressed air. A pressure gage 76 on the top 74 of the reservoir 10 serves for indicating the pressure of the compressed air. The reservoir 10 may be supported by suitable feet 75, 75, as shown. It is shown to be connected with the top 69 of the receptacle 7 by means of a tube 9 and with the top 72 of the second apparatus 48 by means of a tube 18, while stop valves 8 and 17 are respectively inserted in the two tubes 9 and 18.
The plant is operated as follows: The vessel 50 of the first apparatus 1 is filled with a lye suitable for the respective raw paper material. The lye may contain besides water soda with or without addition of borax, soap and an emulsion of chlorhydric acid or other emulsive solvents. Or the lye may be simply a mixture of several of these substances, as may be required. Another useful lye may be made from caustic soda and antiformin with or without addition of benzin soaps or similar combinations. Raw materials, such as printed or written papers, old paste-boards or other old raw materials, or cellulose, ground wood, and similar new raw materials are in convenient quantities charged into the vessel 50, while the shafts 53, 64, 65 with the stars 2, 2 are in motion. The knives of the stars 2, 2 with either smooth or serrated edges and with or without pins or other projections will gradually cut up the raw materials and subject them by agitation to the action of the lye, until a uniform pulp is formed. Already during this operation of the first apparatus 1 one part of the impurities, that is the specifically lighter impurities, will separate and pass into the foam or froth on the level of the liquid. By skimming off the floating foam or froth the said part of the impurities is removed from the contents. When a uniform pulp has been formed, the air-valve 6 on the closed receptacle 7 is opened and the slide-valve 3 is opened for discharging the contents from the vessel 50 of the first apparatus through the tube 4 into the closed receptacle 7. When the first apparatus 1 has been emptied, the slide-valve 3 is again closed and the vessel 50 is freshly charged. Of course the air-valve 6 is again closed and the pulp is left alone in the receptacle 7, so that the chemicals are given time to complete their action upon the materials, while the specifically heavier impurities will precipitate, so that they can be discharged from the bottom 71 through the said discharging devices. After a period equal to that required for the operation of the first apparatus 1 the action of the chemicals upon the pulp will have been completed. If necessary, this may be ascertained by means of the said sampler. At this moment the stop valve 8 is opened for admitting compressed air from the reservoir 10 through the tube 9 to the receptacle 7. Then the compressed air acting upon the level of the cleaned pulp will gradually force the latter upward through the tubes 70 and 5 in the direction of the arrow into the cylinder 90 of the press 12, where the pulp is successively separated from the liquid and is discharged over the chute 14 to the endless belt 15, which carries the pulp freed from liquid to the respective machine for further treatment. The liquid squeezed out of the pulp flows off through the said two tubes into the collecting tube 13, which conducts the liquid to the second apparatus 48, the stop valve 16 having been meanwhile opened. The second apparatus 48 is gradually filled with the liquid, while the receptacle 7 is gradually emptied, the stop valve 47 and the slide-valve 35 being kept closed. At this moment the stop valve 16 is closed and the first apparatus 1 will have completed its operation, so that both the air-valve 6 and the slide-valve 3 can be opened for emptying the contents from the first apparatus 1 to the receptacle 7 as before. The liquid admitted to the second apparatus 48 contains in addition to the part of chemicals not used various impurities, such as loosened resins, gluish constituents, and the like. In order to separate the impurities, suitable chemicals capable of precipitating them are introduced into the second apparatus 48 through the said charging valve, after which the driving gear 88, 87, 86, 85, 20 is started, so that the arms 84 rotating over the bottom 29 will thoroughly mix the chemicals with the liquid and enable them to properly act upon the impurities by precipitation. By the time that the chemicals in the receptacle 7 have completed their action upon the pulp the second apparatus 48 will also have completed its operation, so that its agitator can be set at rest. Then the slide-valve 35 is opened for permitting the liquid to flow off from the second apparatus 48 through the main tube 36 and the branches 37, 38, 39, 40 to the filters above the screens 30, 31, 32, 33, the stop valves 41, 80 and 82 being of course kept closed. At the same time the stop valve 17 is opened for admitting compressed air from the reservoir 10 through the tube 18 to the second apparatus 48, where the compressed air acting upon the level of the liquid will force the latter through the several filters. Of course these filters will separate the precipitate and thus purify the lye, which is now weaker than at the beginning of the operation of the first apparatus. When the first apparatus 1 has been emptied and the slide-valve 3 has been closed, the stop valve 41 is opened, so that the compressed air will force the purified lye from the spaces beneath the sieves 30, 31, 32, 33 through the branches 43, 44, 45, 46, the main tube 78 and the tubes 42¹, 42 upward to the vessel 50 of the first apparatus 1. When the filter chambers are emptied and the vessel 50 is filled, the stop valves 17, 41, 47 and the slide-vlave 35 are again closed.

Evidently additional chemicals will require to be filled into the vessel 50 to compensate for those consumed during the process. In this manner the chemicals are economized, as no part of them is wasted and also of the stuff produced nothing gets lost. A slight quantity of water will have to be added in the vessel 50 to compensate for the loss through the unavoidable moisture of the pulp carried off by the endless belt 15.

Obviously, the quantity of the chemicals introduced into the second apparatus 48 does not compare to that of the raw materials charged into the first apparatus 1, and for this reason the agitator of the second apparatus need not have so many arms or be so complicated as the agitator of the first apparatus, the more so, if the chemicals to be added for the second apparatus 48 are liquid or easily soluble, which is mostly the case.

In case new raw materials, such as cellulose, ground wood, and the like, are employed in the process and when the lye separated from the pulp by the press 12 and introduced into the second apparatus 48 is sufficiently clean, of course the agitator 20, 84 need not be put in motion. Then at the moment, that the first apparatus 1 has discharged its contents into the receptacle 7 and the slide-valve 3 has been closed, the two stop valves 17 and 47 are opened, so that the compressed air admitted from the reservoir 10 to the second apparatus 48 will force the lye out of this apparatus through the tube 42 direct into the first apparatus 1, while of the various filters no use is made.

From time to time the filters on the sieves 30, 31, 32, 33 require to be cleaned, that is to be freed from the precipitate deposited on them. This is effected in the manner, that the two stop valves 80 and 81 are opened, so that pure water under pressure is permitted to pass from the respective source through the tube 81, the branches 46, 45, 44, 43, the sieves 33, 32, 31, 30 and the filters and carry off the precipitate through the branches 37, 38, 39, 40 and the discharging tube 79. After the filters have been cleaned, the two stop valves 80 and 82 are again closed.

It will be seen, that the plant described essentially differs from the ordinary plants used for the production of paper, cardboard, millboard, and the like, and I have to remark here, that I reserve to myself the employment of the method carried into effect by means of this plant in another application for patent therefor filed by me concurrently herewith in the United States Patent Office.

The plant described can be varied in many respects without departing from the spirit of my invention. The air-compressor with the reservoir for compressed air may be omitted, and the pulp may be passed from the receptacle to the press in any other known manner. The liquid in the second apparatus may be permitted to flow by reason of its own weight from the second apparatus to the filters, or it may be passed from the second apparatus to the filters and from thence to the first apparatus or from the second apparatus direct to the first apparatus in any other known manner.

I claim:

1. In a plant for producing paper pulp and freeing it from liquid, the combination with an apparatus adapted to receive a lye and raw materials and comprising an agitator with rotary knives for cutting up the raw materials so as to form a pulp, of a receptacle, means for discharging the contents from said apparatus into said receptacle, said receptacle being adapted to permit the chemicals to complete their action upon the pulp and to precipitate the heavier impurities, a press adapted to press the pulp for squeezing out the lye, means for passing the pulp from said receptacle to said press, means for carrying off from said press the pulp freed from lye, a reservoir for the lye separated by said press, means for passing the lye from said press to said reservoir, and means for passing the lye from said reservoir to said apparatus.

2. In a plant for producing paper pulp and freeing it from liquid, the combination with a first apparatus adapted to receive a lye and raw materials and comprising an agitator with rotary knives for cutting up the raw materials so as to form a pulp, of a receptacle, means for discharging the contents from said first apparatus into said receptacle, said receptacle being adapted to permit the chemicals to complete their action upon the pulp and to precipitate the heavier impurities, a press adapted to press the pulp for squeezing out the liquid, means for passing the pulp from said receptacle to said press, means for carrying off from said press the pulp freed from liquid, a second apparatus for the liquid separated by said press, means for passing the liquid from said press to said second apparatus, said second apparatus comprising an agitator for mixing the liquid with solvents for its impurities, filters, means for passing the liquid from said second apparatus to said filters, means for passing the purified lye from said filters to said first apparatus, and means for cleaning said filters.

3. In a plant for producing paper pulp and freeing it from liquid, the combination with an apparatus adapted to receive a lye and raw materials and comprising an agitator with rotary knives for cutting up the raw materials so as to form a pulp, of a closed receptacle adapted to receive the contents from said apparatus, to permit the chemicals to complete their action upon the pulp and to precipitate the heavier impurities, a press adapted to press the pulp for squeezing out the lye, means for carrying off from said press the pulp freed from liquid, a reservoir adapted to collect the separated liquid from said press, a source of compressed air, tubes connecting the several devices, means for opening said apparatus and discharging its contents into said closed receptacle, and means for opening and closing said source of compressed air so as to force by means of compressed air the pulp out of said receptacle to said press and the liquid out of said reservoir to said apparatus.

4. In a plant for producing paper pulp and freeing it from liquid, the combination with a first apparatus adapted to receive a lye and raw materials and comprising an agitator with rotary knives for cutting up the raw materials so as to form a pulp, of a closed receptacle adapted to receive the contents from said first apparatus, to permit the chemicals to complete their action upon the pulp and to precipitate the heavier impurities, a press adapted to press the pulp for squeezing out the liquid, means for carrying off from said press the pulp freed from liquid, a second apparatus adapted to collect the separated liquid from said press and provided with an agitator for mixing the liquid with solvents for its impurities, filters adapted to receive the mixture from said second apparatus and to turn it into pure lye while retaining the precipitate, a source of compressed air, tubes connecting the several devices, means for opening said first apparatus and discharging its contents into said closed receptacle, means for opening and closing said source of compressed air so as to force at will by means of compressed air the pulp out of said receptacle to said press, the liquid out of said second apparatus to said filters and the purified lye from said filters to said first apparatus or to force the lye from said second apparatus direct to said first apparatus, and means for cleaning said filters.

HEINRICH STRIETH.

Witnesses:
 FRITZ CRASTY,
 ELIZABETH HELMUTH.